United States Patent
Hogg et al.

[15] 3,670,150
[45] June 13, 1972

[54] DYNAMIC RANGE SPLITTER FOR AN ANALYZER OF PARTICLE-PRODUCED PULSES

[72] Inventors: Walter R. Hogg, Miami Lakes; David R. Figueroa, Hialeah, both of Fla.

[73] Assignee: Coulter Electronics, Inc., Hialeah, Fla.

[22] Filed: May 4, 1970

[21] Appl. No.: 34,189

[52] U.S. Cl..................235/151.3, 235/92 PC, 324/71 PC, 328/116
[51] Int. Cl.....................................H03k 17/30, H03k 5/20
[58] Field of Search..................235/151.3, 92 PC; 307/235; 328/116; 324/71 PC; 250/218

[56] References Cited

UNITED STATES PATENTS 2,577,475  12/1951  Miller...........................324/71 PC X
3,539,831  11/1970  Gilbert..........................328/116 X Primary Examiner—Malcolm A. Morrison
Assistant Examiner—R. Stephen Dildine, Jr.
Attorney—Silverman & Cass

[57] ABSTRACT

Generated pulses, having random amplitudes relative to particle sizes which lie in an especially wide range, are fed into a plurality of parallel channels, at the input of each of which there is an amplifier. Each amplifier has a different amplification factor and saturates in response to a correspondingly related maximum input pulse magnitude, so as to define a subrange of acceptable pulses. Saturation of a particular amplifier disables its channel and enables the adjacent, lower amplification, higher channel to accept or be saturated by the same pulse. Each pulse, when accepted by a channel, is further processed for particle analysis purposes. During the processing, the pulse amplitude is reduced by the same amplification factor as that of the accepting channel, so as to return all pulses to their initial relative amplitudes.

26 Claims, 2 Drawing Figures

PATENTED JUN 13 1972

3,670,150

Inventors
WALTER R. HOGG
DAVID R. FIGUEROA.
BY

Silverman & Cass
ATTYS.

3,670,150

DYNAMIC RANGE SPLITTER FOR AN ANALYZER OF PARTICLE-PRODUCED PULSES

RELATION TO CO-PENDING APPLICATIONS

This invention is directed to am improvement to the invention disclosed in copending application, Ser. No. 679,840 filed on Nov. 1, 1967 now U.S. Pat. No. 3,557,352; entitled "Apparatus And Method For Measuring The Dividing Particle Size Of A Particulate System;" and assigned to the Assignee of this invention.

To the extent that may be necessary to appreciate the full teachings of the present invention, said copending application is expressly incorporated herein; however, as will become clear hereinafter, the useful environment of the present invention is not limited to the environment of said copending application, even though it forms the preferred environment as described hereinafter.

BACKGROUND OF THE INVENTION

To a great extent pulse amplitude analysis and particularly the amplitude analysis of particle-produced pulses has been directed to pulses having a rather narrow range of amplitudes, usually far less than 100 to 1. In such analysis, signals near the low end or base line typically represent noise or other unwanted phenomena and are excluded from the analysis by various conventional means. Likewise, signals near the high end of the range often are excluded either because they do not represent the information being transmitted, or they designate abnormal information which should not be transmitted. Additionally, since most signal analyzers operate less linearly near the end portions of their ranges, even if signal amplitudes at the ends of the range were representative of desired information, such range end data would have to be excluded to maintain the integrity of the remainder of the data.

For at least the above reasons the analysis of pulses having a rather narrow amplitude range has not presented significant problems; that is to say, problem related primarily to the amplitude range.

In the prior art are to be found particle analyzers which respond to particle size by producing discrete amplitude related pulses. One such type of analyzer is marketed under the trademark Coulter Counter, which operates upon the Coulter principle as basically disclosed in U.S. Pat. No. 2,656,508 and as improved according to the teachings of U.S. Pat. No. 3,259,842. Although the Coulter Counter has been closely associated with the high precision analysis of blood particles, which have a relatively small size range, the Coulter Counter has had significant use in the field of industrial particle analysis, in which the particle size range is relatively broad.

In the cited copending application, a size range from one-tenth to one thousand microns in particle diameter was discussed and illustrated with respect to distribution curves. The desired goal of the invention of the copending application is to find, in a dynamic operation, the median size of the particulate system being analyzed, such median being the "mass median" as defined therein. A design limitation of the apparatus disclosed in the copending application, which also is generally in pulse amplitude responsive apparatus, as above mentioned, is that it has an amplitude acceptance range narrower than the size range of some particulate systems which are to be analyzed.

One way of overcoming the range limitation is to provide a plurality of redundant channels in parallel, each channel capable of receiving transducing and processing particles and their derived pulses within a specific size range. Such arrangement is illustrated in FIG. 9 of the copending application. However, a plurality of redundant channels results in a costly apparatus as well as one which requires greater cost to operate, etc.

SUMMARY OF THE INVENTION

Accordingly, it is a primary object of this invention to overcome the deficiencies of the prior art by providing, for a pulse amplitude analyzer, a dynamic range splitter, which is coupled between the pulse generator and the pulse processor of the analyzer, so as to avoid redundancy of either of those two major elements.

A further object of the invention is to provide a pulse amplitude range splitter which is modular in design and capable of defining any number of subranges of desired size, by appropriate choice of input amplifiers therein.

According to the invention, the dynamic range splitter comprises at least two parallel channels, each having at its input a saturable amplifier. The amplifiers define contiguous amplitude ranges such that the lower range, i.e., smaller particle size range, has its upper limit at the lower limits of the upper size range. The lower range amplifier has proportionally a greater amplification factor. Pulses are simultaneously fed into both amplifiers from the particle pulse transducer. Pulses lying within the lower range are amplified to be handled by the pulse processor. Acceptance by the lower channel disables the upper channel. Whenever a pulse is generated that is too large for the lower channel, its amplifier saturates and activates logic which disables the lower channel and enables the upper channel to send without amplification that pulse to the pulse processor. After the pulses each have been at least partly processed, and before each pulse amplitude is ultimately employed for readout purposes, or for purposes in which its original amplitude is required, those pulses which were amplified in the lower channel have their amplitudes reduced by the same amount.

DESCRIPTION OF THE PREFERRED EMBODIMENT

Figure 1:
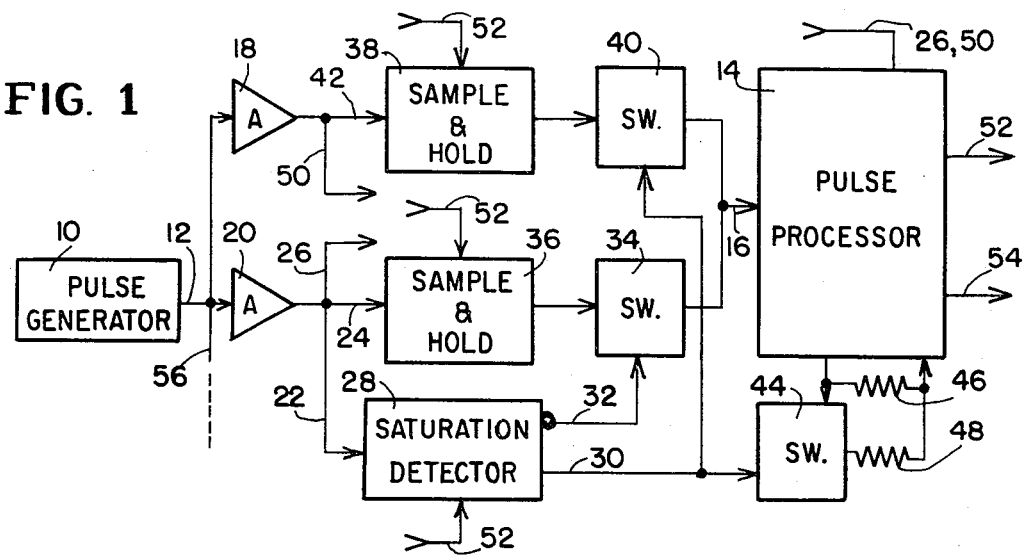
FIG. 1 is a block diagram of a basic embodiment of the invention.

With reference to FIG. 1, at its left side is a pulse generator 10 having an output line 12, which carries individual pulses having a wide range of amplitudes. The form of pulse generator is not limiting to this invention, nor is the nature of any input to the generator. A pulse processor 14 having an input line 16 is shown at the right side of FIG. 1. Because design limitations, the processor is incapable of accurately responding to the full range of pulse amplitudes from the generator. For that reason, according to the invention, the pulses on the output line 12 are to be subdivided into a plurality of subranges, then are amplified and/or logically operated upon depending upon their individual amplitudes, and then are fed to the input line 16 with such an amplitude and reduced amplitude range that is within the design limitations of the processor 14.

For purposes of making the preferred embodiment more easily understood, it will be assumed that the pulse generator 10 is part of a particle size analysis apparatus and that it generates a pulse for each particle sensed or scanned, the pulse amplitude being proportional to the particle size. Both optical and nonoptical particle sensors known in the art meet the design of the generator 10. One specific form of pulse generator 10 is that taught in the cited U.S. Pat. Nos. 2,656,508 and 3,259,842, which provides a pair of electrodes at opposite ends of the scanning ambit of an electric field defined by a microscopic aperture, through which a suspension containing a particulate system passes. Each particle produces a discrete pulse, whose amplitude is proportional to the size of that particle.

In like manner, the pulse processor 14 has its counterpart in many known apparatus, including particle analyzers. Generically, it is a pulse amplitude analyzer. The pulse processing apparatus in the cited copending application was designed to determine the mass median of a particulate system having a relatively wide dynamic range. To accomplish its task, that processor establishes a variable threshold and each particle is compared with the threshold in an algebraic manner. The algebraic sum is accumulated and fed back to vary the threshold level. In this manner, at each instant of time, the mass median is being dynamically developed and at such time that the threshold level is positioned to cause a null balance in the algebraic summing, the threshold level defines the mass median. Percentile relationships other than mass median can be developed in a similar manner by adjustment of the algebraic summing to null balance at a value other than the 50 percent value.

From the above it will be appreciated that the pulse processor 14 can be capable of operating with relative pulse amplitude values, rather than actual amplitude values; hence, if a range of pulses that lies outside of that acceptable by the processor 14 is temporarily made to lie in the acceptable pulse range, then the dynamic range of the processor has been increased. Of course, the actual pulse value may have to be reobtained to complete the analysis procedure.

Figure 2:
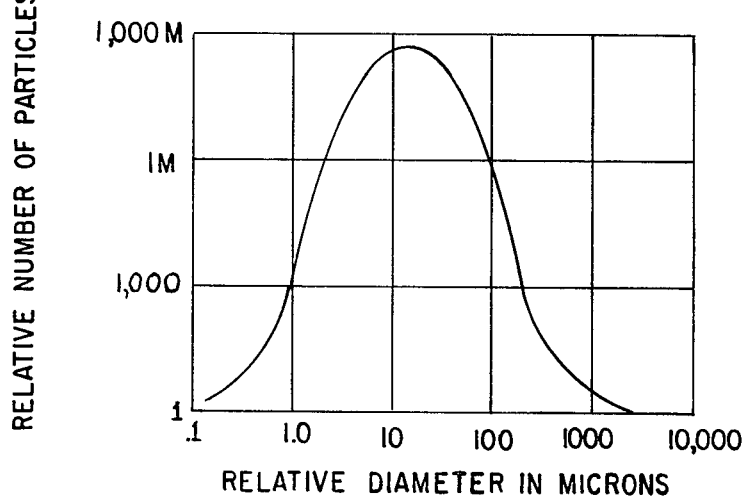
FIG. 2 is a graph illustrating the differential curve, in the classical bell-shaped configuration, of a particulate system of wide dynamic range.

Typical of a particulate system of wide dynamic range is the system shown in the graph of FIG. 2. Such particulate system may be an industrial slurry or powder in which the diameter range of the particles extends from less than 1 micron to over 1,000 microns, e.g. well in excess of a 1:10,000 relationship and approaching a 1:40,000 ratio; hence, beyond the range of the typical pulse processor 14. If, however, the range were effectively reduced to be a two hundredth of the actual value, then the processor 14 could produce an accurate analysis.

Accordingly, the output line 12 from the generator 10 is coupled to a pair of saturable amplifiers 18 and 20. The amplifier 18 will be assumed to be of unity gain and the gain of the amplifier 20 is 200. Also assumed will be the acceptance or operating range for each amplifier; with the amplifier 20 operating upon input pulses in the range of 250 microvolts to 50 millivolts, and the amplifier 18 having a 50 millivolt to 10 volt range. In this arrangement, the two amplifiers define contiguous ranges having a combined 1:40,000 acceptance limit. Hence, if a particle of one-tenth micron diameter were to be at the lower limit of the range of the amplifier 20, then the upper limit of the amplifier 18 would be a particle having a 4,000 micron diameter, and the upper limit of the lower range as well as the lower limit of the upper range would be a particle having a 20 micron diameter.

Because of the above stated ranges and the amplification factors, a one-tenth micron particle would produce a 250 microvolt amplitude pulse on the line 12 and be amplified by the amplifier 20 to become a 50 millivolt pulse, which is the same voltage as at the lower end of the range of the amplifier 18. Likewise, a 20 micron particle would cause a 50 millivolt pulse on the line 12, which, if passed to the amplifier 20 would become a 10 volt pulse, which is the same voltage as at the upper end of the range of the amplifier 18. However, if the 50 millivolt pulse from 20 micron particle passed into the upper range amplifier 18, it would be at the lower limit of that range. It therefor follows that a 4,000 micron particle will produce a 10 volt pulse, which lies at the upper range of the amplifier 18. Accordingly, although the inputs to the two amplifiers can have a 1:40,000 range, which is beyond the capabilities of the processor 14, their outputs lie within the same voltage range which is only 1:200 and is easily acceptable by the processor.

From the above discussion it should be clear that each amplifier should be effective over only its own range. To accomplish this operation, without the costly prior art approach of providing a different pulse generator for each amplifier, with the generator doing the job of range selection, the present invention provides pulse steering by way of saturation detection.

The amplified output from the lower range amplifier 20 is carried on three lines 22, 24 and 26, with the line 22 being coupled to an input of a saturation detector 28. The saturation detector has a pair of oppositely poled output lines 30 and 32, with the line 32 providing one input to a switch 34. The switch 34 has as its output the input line 16 to the processor 14. If the pulse on the generator output line is in the lower range of 250 microvolts to 50 millivolts, the amplifier 20 will not saturate, and the detector 28 will not inhibit the operation of the switch 34. However, if the input pulse is greater than 50 millivolts, the amplifier 20 will saturate and the detector 28 will send an inhibit signal on the line 32 to the switch 34.

A sample and hold circuit 36 has as an input the output line 24 from the amplifier 20. The circuit 36 is also known in the art as a pulse stretcher and operates by following the leading edge of a pulse to its peak and then holds the peak for a predetermined length of time so that the peak amplitude of a pulse can be transferred to the next stage, which in this case is the switch 34. Accordingly, a pulse on the line 12 and within the range of the lower amplifier 20 will be amplified, operated upon by the sample and hold circuit 36 and then passed through the switch 34 to the pulse processor 14, with the amplitude of such passed pulse being within the range of the upper amplifier 18 and hence within the range of acceptance of the processor 14.

A second sample and hold circuit 38 and a second switch 40 are series coupled to the amplifier 18 via its output line 42 to feed pulses into the input line 16 of the processor 14. The output from the saturation detector in its line 30 is coupled to the switch 40 for control purposes. Thus there are provided two parallel channels, each having an amplifier, a sample and hold circuit and a controlled switch, and both channels are controlled by the saturation detector as next described.

Since the output lines 30 and 32 are oppositely poled, whenever there is no saturation of the amplifier 20, as earlier discussed, the switch 40 will be inhibited and no pulses will reach the processor from the upper range channel. Conversely, when too large a pulse, with respect to the lower range, is on the input line 12, the saturation detector will inhibit the switch 34 and its channel and will enable the switch 40 and its channel.

As seen by the pulse processor 14 each pulse on the input line 16 has an acceptable amplitude between 50 millivolts and 10 volts and is accordingly processed therein. Such processing is not invalidated by the fact that the pulses in the lower range were amplified, as long as the amplitude processing is accomplished with respect to relative amplitudes and not actual amplitudes. Nevertheless, it is likely that some recognition of actual amplitude will become necessary, such as in the accumulation of total particle volume by integration of actual pulse amplitudes as seen at line 12.

Accordingly, there is provided an amplitude reduction circuit that is controlled by the saturation detector 28, by means of its output line 30 and a series connected third switch 44. The reducer includes a pair of resistors 46 and 48 which are connected with respect to the switch 44 and the processor 14 to be in parallel with each other relative to the processor when the switch 44 is enabled or in circuit and, when the switch is open or disabled, only the resistor 46 is coupled to the processor 14. If the resistance of the resistor 48 is 1/199 of that of the resistor 46, then whenever the lower channel is passing an amplified pulse into the processor 14, the resistance of the reducer is that of the resistor 46 and has the same reduction value of 200 as was the gain of the amplifier 20. In the opposite or upper channel mode of operation, when the amplifier 20 is saturated, the switch 44 is enabled and the reducer includes the parallel resistors, the resistance is 1/200 of the just described lower channel mode and the pulses are considered as being not reduced.

To complete the logic connections, the amplifier 18 has a second output line 50, which, with the output 26 from the amplifier 20 can provide timing and threshold information for operation of the pulse processor. The pulse processor has an output 52 which can provide reset control over the sample and hold circuits and the saturation detector so as to place these elements in condition to receive and independently operate on each successive pulse from the generator 10. The output 54 from the processor can carry resultant data, such as mass median to readout or further operational stages.

The generator output line 12 is shown as having a broken line segment 56. In the event that range parameters or other design criteria warrant, a third or more channels can be provided. The operation would be substantially as above disclosed, except for the fact that a pulse could cause the saturation of more than one of the lower amplifiers and thereby disable the controlled switches in each of those channels, while enabling only the next higher channel. Likewise, the reducer would have to be suitably modified to include several magnitudes of reduction, each related to the amplification of a corresponding channel amplifier. If desired the reducer could comprise a combination of amplifier and reducer, with some channel responses below a certain level being reduced and those above that level being amplified to achieve the desired mathematic end product of reobtaining the actual amplitude of each pulse in each of the subranges defined by each of the channels.

With respect to the pulse processor in the cited copending application, the herein, just above described reducer could be positioned just before the comparison structure of the processor. In such an arrangement, the comparison structure also would be split into respective channels, corresponding to the amplitude range channels, and the comparison output then would be fed back into the variable threshold means.

With respect to the term "diameter" in FIG. 2 and the associated discussion of particle diameters and diameter ranges, those skilled in the art of particle analysis will appreciate that some analyzers respond to linear measurements, such as diameter; whereas, the Coulter Counter relates particle size to particle volume. Hence, the pulse amplitude output from the generator 10, if a Coulter Counter, would be proportional to particle volume. Accordingly, the term "diameter" would be replaced by "volume," and "cubic" would be needed as a modifier for "micron" when considering pulse transducing and generation by a Coulter Counter.

It is believed that the invention in its broad form as well as in a specific embodiment and environment has been sufficiently disclosed such that those skilled in the art will appreciate its scope and be able to apply the invention to various environments without departing from the scope and spirit of the invention.

What is sought to be protected by United States Letters Patent is:

1. A dynamic range splitter for use with a pulse amplitude processor which has an amplitude acceptance range narrower than the range of pulse amplitudes which is to be processed, said range splitter effectively narrowing the amplitude range of the pulses to be within the acceptance range and comprising:
   an input terminal for receipt of all pulses to be processed,
   a plurality of parallel channels coupled to said input terminal so as to receive the pulses to be processed and having a common output terminal connectable to the pulse amplitude processor,
   each said channel including means for defining a pulse amplitude subrange such that each subrange is no wider than the acceptance range of the processor,
   said subrange defining means, in at least a first of said channels, being arranged to alter the amplitude of each pulse received in that channel to cause the resulting amplitudes to lie within the subrange of another of said channels, whereby the amplitudes of all pulses at the output terminal of said first and said another channel lie within the acceptance range of the pulse processor, and
   controlled means in each of said channels for selectively enabling one of the channels and inhibiting the remaining channels from passing a pulse to said output terminal,
   said controlled means being coupled to be responsive to the amplitude of each pulse to be processed.

2. A dynamic range splitter according to claim 1 wherein said subrange defining means includes an amplifier.

3. A dynamic range splitter according to claim 2 wherein said amplifier in said first channel has a gain proportional to the width of said another channel, and said width is determined by the ratio of the largest to the smallest pulse amplitude designated for that channel.

4. A dynamic range splitter according to claim 3 wherein all said channels have the same width, and
   the gain of said amplifier in said first channel is equal to said width.

5. A dynamic range splitter according to claim 1 wherein the subranges are contiguous,
   the subrange defining means in said first channel is arranged to alter the pulse amplitudes by a factor which is proportional to the width of the acceptance range of the pulse processor, and
   said width is determined by the ratio of the largest to the smallest pulse amplitude acceptable by the processor.

6. A dynamic range splitter according to claim 1 wherein there is provided
   control means coupled between said subrange defining means in at least said first channel and each of said controlled means, for exercising said enabling and inhibiting control.

7. A dynamic range splitter according to claim 6 wherein said control means comprises a saturation detector and
   said subrange defining means comprises an amplifier, at least in said first channel,
   whereby saturation of said amplifier in said first channel would be by a pulse amplitude above the subrange of that channel and would cause said saturation detector to inhibit said first channel and enable one of said another channels whose subrange encompasses that pulse amplitude.

8. A dynamic range splitter according to claim 1 wherein there is provided
   means for operating upon each amplitude-altered pulse to cause its original amplitude to be reobtained, and
   said operating means have an input and an output coupled to the pulse processor so as to return each such operated upon pulse to the processor for further processing.

9. A dynamic range splitter according to claim 8 wherein said operating means includes
   controlling means coupled to be responsive to the original amplitude of each pulse to be processed for selectively enabling said operating means.

10. A dynamic range splitter according to claim 9 wherein said operating means comprises
    a pair of impedance elements arranged to be parallel connected by said controlling means.

11. A dynamic range splitter according to claim 10 wherein there is provided
    control means coupled between said subrange defining means in at least said first channel and said controlling means for control over said controlling means.

12. A dynamic range splitter according to claim 11 wherein said control means comprises a saturation detector and
    said subrange defining means comprises a saturable amplifier, at least in said first channel.

13. A dynamic range splitter according to claim 12 wherein said control means also is coupled to said controlled means for exercising said enabling and inhibiting control.

14. A dynamic range splitter according to claim 13 wherein the width of each subrange is determined by the ratio of the largest to the smallest pulse amplitude designated for each said subrange,
    all subranges have the same width, which is substantially that of the acceptance range of the pulse processor, and
    the gain of said amplifier in said first channel is equal to its subrange width.

15. A dynamic range splitter according to claim 14 and in combination therewith
    a generator for the pulses to be processed,
    said generator being connected to said input terminal and arranged to produce pulses the amplitude of each of which is proportional to the size of a particle in a particulate system which is to be analyzed by means of said generator and said dynamic range splitter.

16. A dynamic range splitter and pulse generator according to claim 15 wherein
    said particle size is its volume and said generator includes means for generating pulses according to the Coulter principle.

17. A dynamic range splitter according to claim 14 and in combination therewith
a pulse amplitude processor connected to said output terminal and having an acceptance range substantially equal to the width of each of said subranges,
said pulse amplitude processor being constructed and arranged to determine the median amplitude of the pulses to be processed.

18. A dynamic range splitter and pulse amplitude processor according to claim 17 and in combination therewith
a pulse generator connected to said input terminal,
said pulse generator including means for generating pulses according to the Coulter principle,
whereby the combination is capable of determining the mass median of a particulate system.

19. A dynamic range splitter according to claim 1 and in combination therewith
a pulse amplitude processor connected to said output terminal and having an acceptance range substantially equal to the width of each of said subranges,
said pulse amplitude processor being constructed and arranged to determine the median amplitude of the pulses to be processed.

20. A dynamic range splitter and pulse amplitude processor according to claim 19 and in combination therewith
a pulse generator connected to said input terminal,
said pulse generator including means for generating pulses according to the Coulter principle,
whereby the combination is capable of determining the mass median of a particulate system.

21. A dynamic range splitter interposed between a pulse generator and a pulse amplitude processor,
said pulse generator being constructed and arranged to generate pulses each having an amplitude proportional to the size of a particle in a particulate system to be analyzed,
said pulse amplitude processor having an acceptance range narrower than the range of pulse amplitudes capable of being generated by said pulse generator with respect to the particulate system,
said dynamic range splitter having an input terminal connected to said pulse generator, an output terminal connected to said pulse amplitude processor and further comprising:
a plurality of parallel channels coupled between said input and output terminals,
each said channel including means for defining a pulse amplitude subrange such that each subrange is no wider than the acceptance range of said pulse processor,
said subrange defining means, in at least a first of said channels, being arranged to alter the amplitude of each pulse received in that channel to cause the resulting amplitudes to lie within the subrange of another of said channels, whereby the amplitudes of all pulses at the output terminal of said first and said another channel lie within the acceptance range of said pulse processor, and
controlled means in each of said channels for selectively enabling one of the channels and inhibiting the remaining channels from passing a pulse to said pulse processor,
said controlled means being coupled to be responsive to the amplitude of each pulse from said pulse generator,
whereby said dynamic range splitter is effective to narrow the amplitude range of the pulses from said generator so that they are within the acceptance range of said pulse processor.

22. The combination according to claim 21 wherein
said pulse amplitude processor is constructed and arranged to determine the median size of the particles in the particulate system.

23. The combination according to claim 22 wherein
said pulse generator includes means for generating pulses according to the Coulter principle and thereby said median particle size is the mass median of the particulate system.

24. The combination according to claim 23 wherein
the width of each subrange is determined by the ratio of the largest to the smallest pulse amplitude designated for each said subrange,
all subranges have the same width, which is substantially that of the acceptance range of the pulse processor,
said subrange defining means comprises an amplifier, and
the gain of said amplifier in said first channel is equal to its subrange width.

25. The combination according to claim 24 wherein there is provided
means for operating upon each amplitude-altered pulse to cause its original amplitude to be reobtained,
said operating means have an input and an output coupled to the pulse processor so as to return each such operated upon pulse to the processor for further processing, and
said operating means includes controlling means coupled to be responsive to the original amplitude of each pulse to be processed, for selectively enabling said operating means and a pair of impedance elements arranged to be parallel connected by said controlling means,
the ratio of the impedance value of said impedance elements in parallel as compared with the impedance value of a selected one of them being the same as the gain of said amplifier in said first channel.

26. The combination according to claim 25 wherein there is provided
control means in the form of a saturation detector coupled between said subrange defining means in at least said first channel and said controlling means, for control over said controlling means, and
said control means also is coupled to said controlled means for exercising said enabling and inhibiting control.

* * * * *